United States Patent
Mori

(10) Patent No.: US 6,272,746 B1
(45) Date of Patent: Aug. 14, 2001

(54) CIRCUIT BODY AND PROCESS FOR PRODUCING THE CIRCUIT BODY

(75) Inventor: Toshiyuki Mori, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/161,723

(22) Filed: Sep. 29, 1998

(30) Foreign Application Priority Data

Sep. 30, 1997 (JP) .................................................. 9-267139

(51) Int. Cl.[7] .......................... H01R 43/00; B25B 11/00
(52) U.S. Cl. .................... 29/868; 29/747; 29/743; 29/33 M; 269/903; 269/21
(58) Field of Search ................... 29/868, 33 M, 29/33 F, 747, 867, 743; 174/72 A, 72 TR; 269/903, 21

(56) References Cited

U.S. PATENT DOCUMENTS

| | | | |
|---|---|---|---|
| 3,168,617 | * 2/1965 | Richter . | |
| 4,319,075 | * 3/1982 | Willette | 174/117 FF |
| 4,417,096 | * 11/1983 | Willette | 174/71 R |
| 5,917,151 | * 6/1999 | O'Brien et al. | 174/72 A |
| 5,918,365 | * 7/1999 | Uchida et al. | 29/868 |
| 5,925,304 | * 7/1999 | Kudoh | 264/487 |
| 6,031,184 | * 2/2000 | Ichikawa et al. | 174/72 TR |

* cited by examiner

*Primary Examiner*—Lee Young
*Assistant Examiner*—A. Dexter Tugbang
(74) *Attorney, Agent, or Firm*—Finnegan, Henderson, Farabow, Garrett & Dunner, L.L.P.

(57) ABSTRACT

In a wire harness, 20, an arrange shape of a plurality of electric wires 15 is held by bonding upper and lower films 19 and 16 to each other. A connector 18 is connected to a terminal portion of the electric wires 15. A connector fixing portion 21 is provided to both the upper and lower films 19 and 16 to be bonded to an outer peripheral portion of the connector 18 except for an end portion 18a thereof to fix the connector 18.

11 Claims, 5 Drawing Sheets

CIRCUIT BODY AND PROCESS FOR PRODUCING THE CIRCUIT BODY

BACKGROUND OF THE INVENTION

1. Field of the Invention

The present invention relates to a flat circuit body comprising connector and a wire harness used for a door of an automobile, for example, and specifically to a circuit body in which a waterproof property of connector is improved, a shape of the wire harness is held, and a position of the connector is fixed, and to a process for producing the circuit body.

2. Description of the Related Art

Conventionally, a circuit body used for a door of an automobile, for example, is produced such that a connector is previously connected to necessary terminal portions of a plurality of electric wires, the electric wires are made flat, and are held in a predetermined wiring shape to form a wire harness.

However, since such a process for producing the circuit body requires a waterproofing of the connector, the connector is previously covered with a waterproofing cap made of rubber or the like, or a connecting portion of the connector is previously applied to a waterproofing agent such as grease. Such treatment steps are required, and therefore the circuit body can not be produced speedily. Moreover, such treatments can not completely waterproof the connector, and can not provide a reliable waterproof property.

Further, since only the shape of the wire harness is held and the connector is not fixed in the conventional producing process, the connector totters and moves freely. As a result, when fitting the connector, it is necessary to position the connector, and fitting operation is difficult.

SUMMARY OF THE INVENTION

It is an object of the present invention to provide a circuit body in which a connector can be easily and reliably waterproofed in a case wherein the connector is arranged on a terminal portion of electric wires and a process for producing the circuit body. It is another objection of the invention to provide a circuit body in which a shape of a wire harness can be held at the same as fixing a connector and a process for producing the circuit body.

To achieve the above objects, according to a first aspect of the present invention, there is provided a circuit body comprising a wire harness formed by holding an arrange shape in a plurality of electric wires by bonding an upper film and a lower film to each other, a connector arranged on a terminal portion of the electric wires, and a connector fixing portion provided to both the upper and lower films to be bonded to an outer peripheral portion of the connector except for an end portion thereof to fix the connector.

Because the connector is fixed to a proper position by the connector fixing portion of the circuit body, the connector does not totter and can be easily fitted to the mating connector without positioning.

The connector fixing portion is provided by bonding the upper and lower films to the outer peripheral portion of the connector, and is integral with the upper film, the upper and lower films providing the arrange shape to the wire harness. By the fact that the connector fixing portion is integral with the upper and lower films, the connector fixing portion provides a reliable waterproof property. Therefore, a waterproof treatment for the terminal portion is unnecessary. Also, because the upper and lower films are bonded to the outer peripheral portion of the connector except for the end portion of the connector, the films can no be a hindrance to fitting of the mating connector to the end portion.

Furthermore, because the connector fixing portion is formed at the same time as providing the shape to the wire harness, the connector fixing portion can be formed easily without using a special member or carrying out a special treatment.

As a preferred embodiment, the connector fixing portion may be formed on one of the upper and lower films.

The connector fixing portion may be formed on both the upper and lower films. However, by forming the connector fixing portion on one of the films as described above, the other film can be treated in a conventional manner. As a result, the connector fixing portion can be formed easily.

According to a second aspect of the invention, there is provided a process for producing a circuit body comprising the steps of arranging, in an arranging recess portion in a vacuum forming die, a plurality of electric wires to a terminal portion of which a connector is connected, in a state wherein the wires are interposed between an upper film and a lower film, sandwiching an outer peripheral portion of the connector except for an end portion thereof between the upper and lower films, holding an arrange shape in the electric wires by vacuum sucking by the vacuum forming die and bonding the upper and lower films to each other, and fixing the connector by the upper and lower films.

In this process, the upper and lower films are bonded to each other to provide the arrange shape to the electric wires, simultaneously as which the films are bonded to the outer peripheral portion of the connector to fix the connector. Consequently, a step of fixing the connector is unnecessary, and the connector can be fixed speedily and easily.

As a preferred embodiment, the connector may be fixed provisionally by disposing the connector in the arranging recess portion at the time of arranging the electric wires in the vacuum forming die.

Because the connector is provisionally fixed by being disposed in the arranging recess portion, the connector does not deviate when the upper and lower films are bonded to each other to fix the connector. Therefore, the connector can be fixed accurately.

Further, as a preferred embodiment, the vacuum forming die may be provided with projecting ribs, and a space between the ribs may be used as the arranging recess portion.

Because the space between the ribs is used as the arranging recess portion, it is unnecessary to recess the vacuum forming die to form the arranging recess portion, thereby forming the arranging recess portion easily. Also, the arranging recess portion can be changed easily only by exchanging the ribs or changing positions of the ribs.

BRIEF DESCRIPTION OF THE DRAWINGS

FIG. 1A is a perspective view and FIG. 1B is a plan view.

FIG. 2A is a perspective view and FIG. 2B is a plan view.

FIG. 3A is a perspective view and FIG. 3B is a plan view.

FIG. 5A is a perspective view and FIG. 5B is a plan view.

DETAILED DESCRIPTION OF THE PREFERRED EMBODIMENT

Figure 1A:
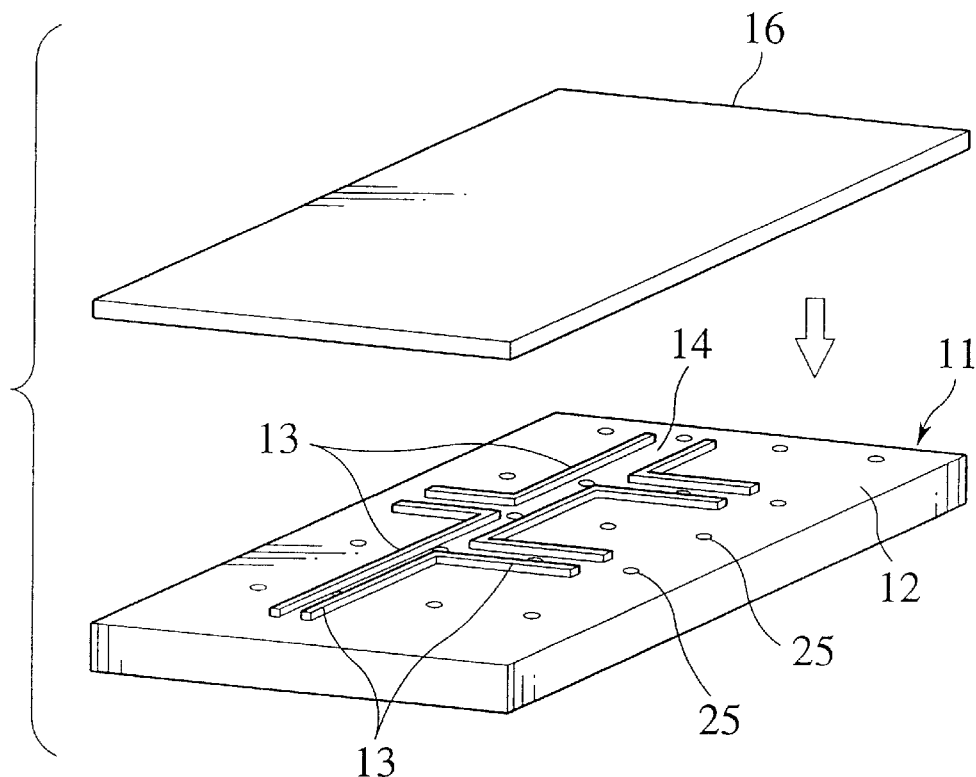
FIGS. 1A and 1B show a relationship between a vacuum forming die and a lower die film in a producing process according to the present invention.

FIGS. 1A to 5B show, in the order of steps, an embodiment of a process for producing a circuit body in terms of a circuit structure according to the present invention. In the drawings, a reference numeral 11 designates a vacuum forming die.

Figure 1B:
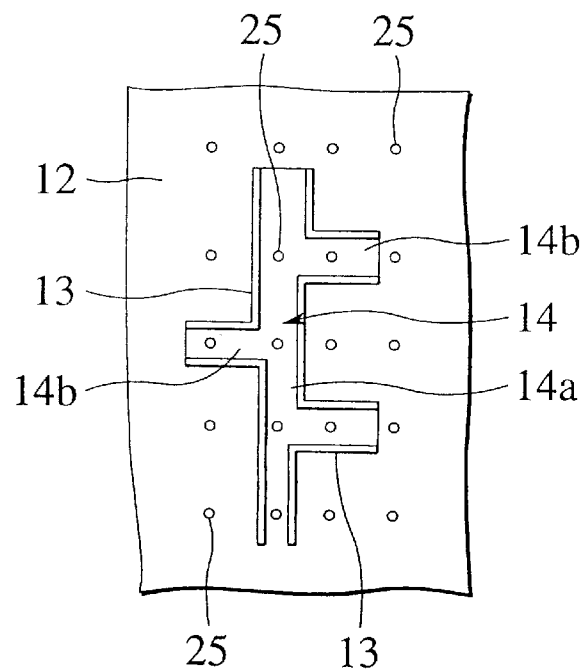

As shown in FIGS. 1A and 1B, an upper face of the vacuum forming die 11 is a flat forming face 12 which is provided with a plurality of projecting ribs 13. The plurality of ribs 13 are fixed and projected on an upper face of the forming face 12 by bonding or threads. An arranging recess portion 14 is formed between the opposed ribs 13.

Figure 2A:
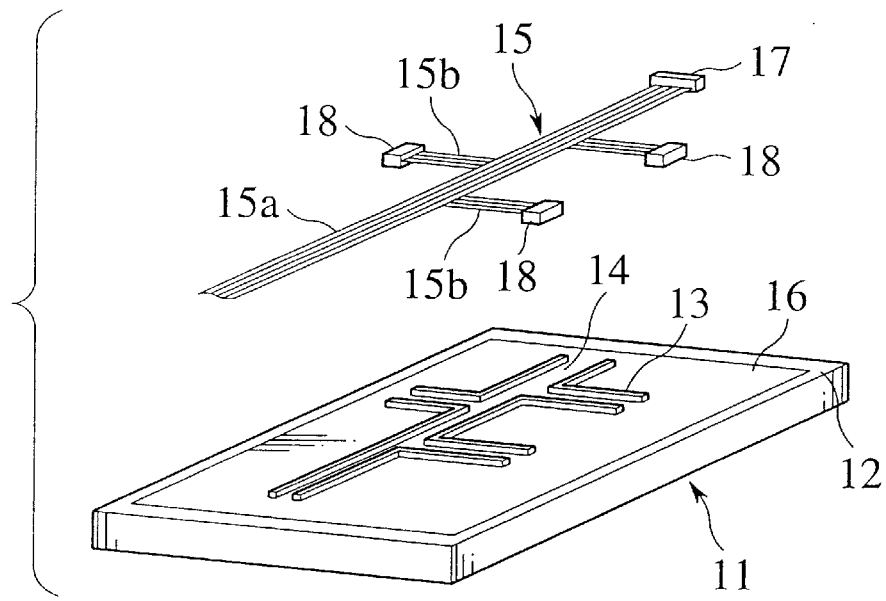
FIGS. 2A and 2B show a step of arranging electric wires of an embodiment.
Figure 2B:
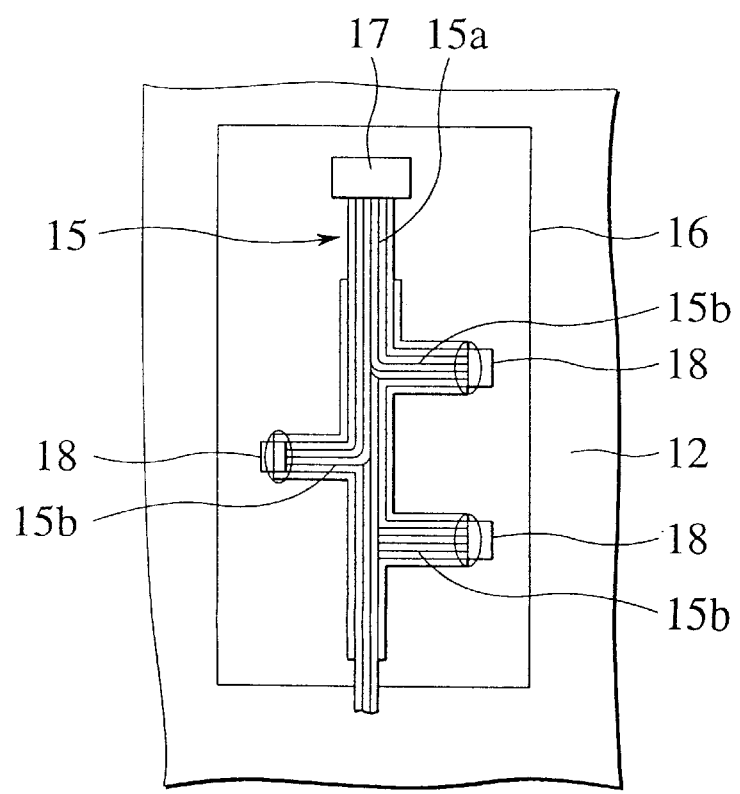

The arranging recess portion 14 formed by the plurality of ribs is to provide a predetermined arrange shape in terms of a circuit pattern to electric wires 15 (see FIGS. 2A and 2B). The shown arranging recess portion 14 comprises, a main wiring forming portion 14a in a shape of a straight line and a plurality of branch wiring forming portions 14b perpendicular to the main wiring forming portions 14a, ah shown in FIG. 1B.

The projecting ribs 13 are formed on the forming face 12 and a space between the ribs 13 is utilized as the arranging recess portion 14, so that it is unnecessary to recess the forming face 12 to form the arranging recess portion 14. Therefore, it is advantageous that the arranging recess portion 14 can be formed easily, and the arranging recess portion 14 can be changed easily by exchanging or moving projecting positions of the ribs 13. Also, upper and lower films 19 and 16 are sucked towards the forming face 12 with the films 19 and 16 supported on the projecting ribs 13, and it is possible to provide strength to the upper and lower films 19 and 16.

A plurality of sucking holes 25 are formed on the forming face 12 of the vacuum forming die 11. The sucking holes 25 are formed to be scattered outside and inside (the arranging recess portion 14) the opposed ribs 14. The upper and lower films 19 and 16 are sucked toward the forming face 12 by a vacuum suction through the sucking holes 25.

Next, the producing process of the embodiment will be described.

As shown in FIG. 1A, the forming face 12 of the vacuum forming die 11 provided with the projecting ribs 13 is covered with the lower die film 16. The lower die film 16 is lightly sucked through the sucking holes 25, and is brought into close contact with the forming face 12.

Then, as shown in FIGS. 2A and 2B, the plurality of electric wires 15 are arranged on the vacuum forming die 11. This arrangement is carried out by disposing the plurality of electric wires 15 in the arranging recess portion 14. In the present embodiment, connectors 17 and 18 previously connected to terminal portions of the electric wires 15 are used. In this case, the connector 17 is previously connected to a terminal of a main wiring 15a of the electric wire 15. The connector 18 is previously connected to each of terminal portions of plural branch wirings 15b which branch off from the main wiring 15a.

The electric wire 15 is arranged in the arranging recess portion 14 so that the connectors 18 arranged on the terminal portions of the branch wirings 15b are disposed to be fitted between the ribs 13, the wirings 15b are arranged therebetween.

Connectors 18 are fitted between the ribs 13 and are provisionally fixed to the ribs 13, so that unexpected displacement of the connectors 18 is limited. Consequently, the connectors 18 do not deviate from proper positions due to the suction and vibration, and are provisionally fixed in the positions with accuracy. As a result, it is possible to fix the connectors 18 to appropriate positions relative to a wire harness 20 produced succeedingly.

The connector 17 arranged on the main wiring 15a is not fitted between the ribs 13 to be fixed provisionally, similarly to the connectors 18 arranged on the branch wirings 15b.

Figure 3A:
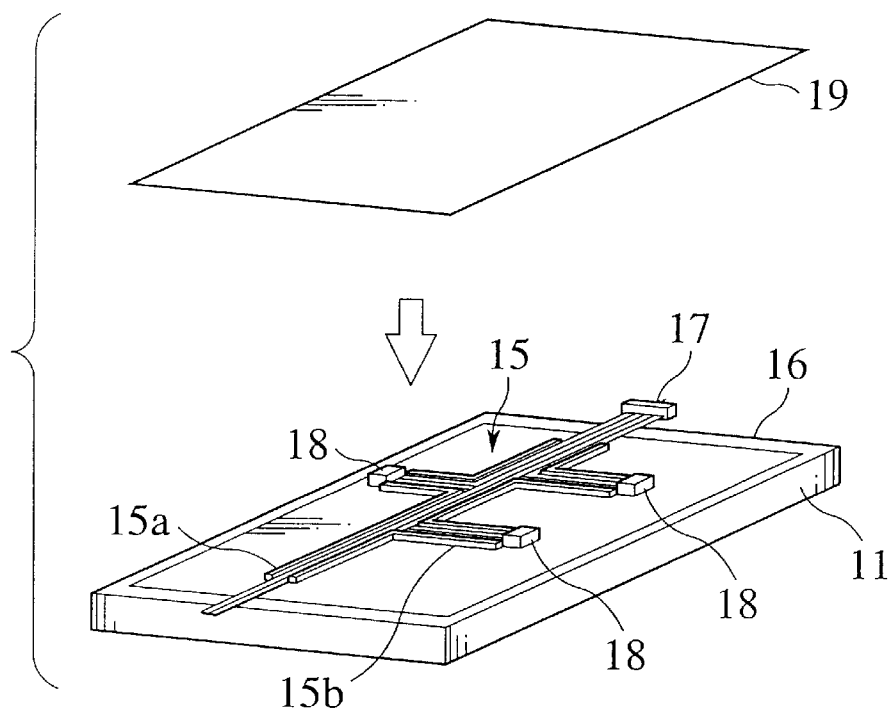
FIGS. 3A and 3B show a step of disposing an upper die film of the embodiment.
Figure 3B:
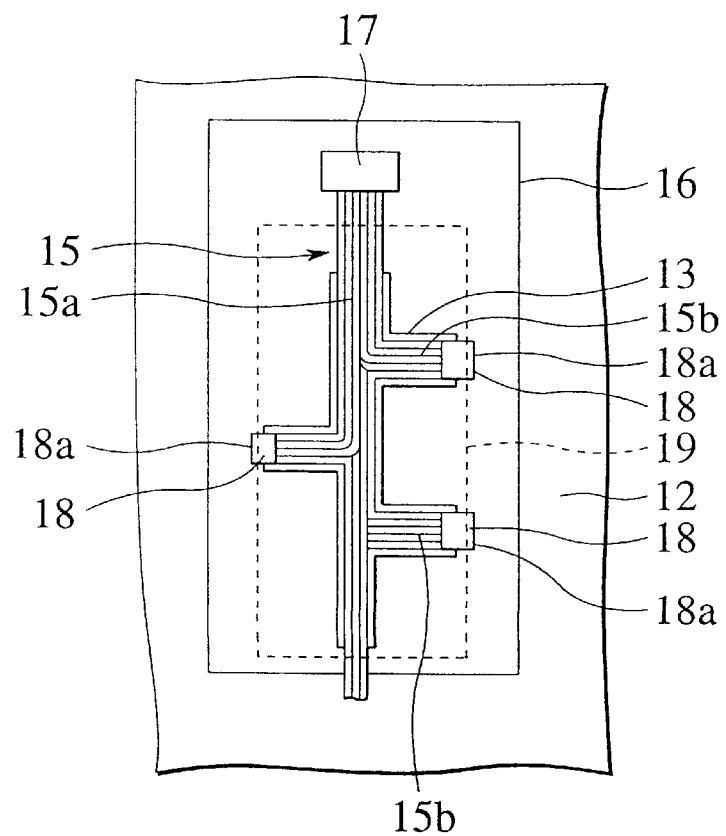

After the electric wire 15 is arranged in the arranging recess portion 14 and is provisionally fixed to the connectors 18 as described above, the upper die film 19 is put on the electric wires 15 and the forming face 12 and peripheral portion of the upper film 19 is brought into contact with the lower die film 16, as shown in FIGS. 3A and 3B. Then, the upper die film 19 is sucked through the sucking holes 25 and is brought into close contact with and bonded to the electric wires 15 and the lower die film 16.

Figure 4A:
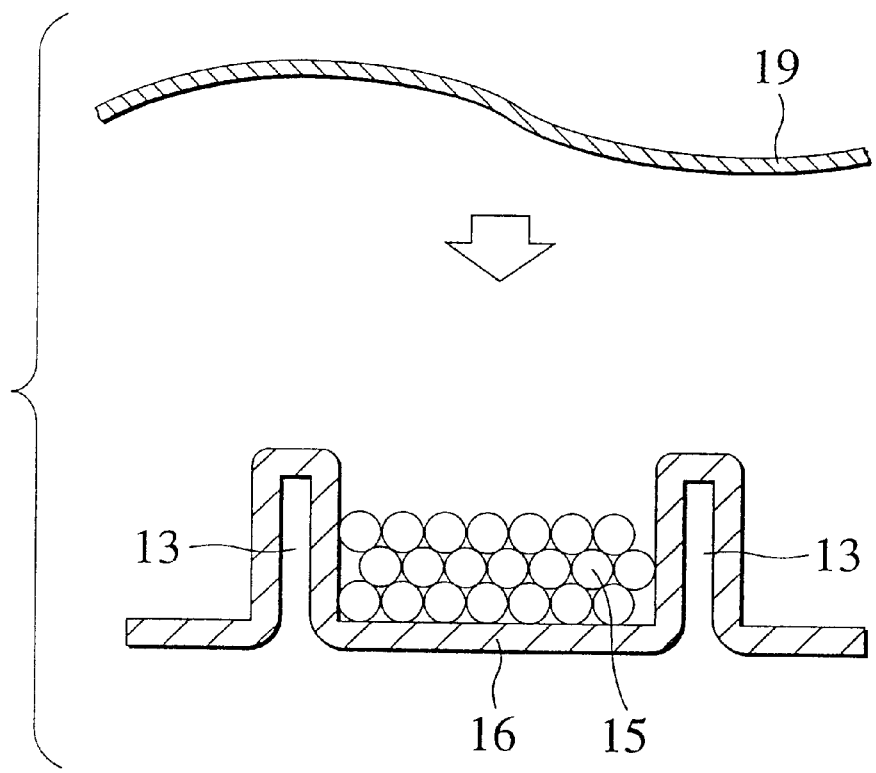
FIG. 4A is a sectional view showing the lower die film and the upper die film before being bonded to each other.
Figure 4B:
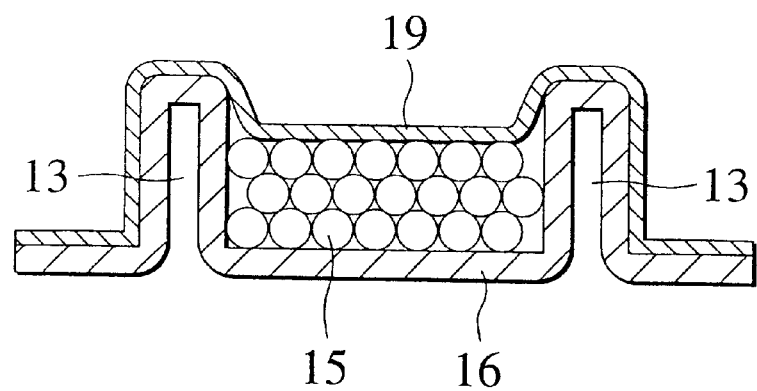
FIG. 4B is a sectional view showing the lower and upper die films after being bonded to each other.

FIGS. 4A and 4B show steps of bonding the upper die film 19 to the lower die film 16. A hot-melt adhesive or other adhesives is applied on one or both of the opposed faces of the upper die film 19 and the lower die film 16. The vacuum forming die 11 is heated with the films 16 and 19 in close contact with each other, and therefore the upper and lower films 19 and 16 are bonded to each other. Thus, an arrange shape of the wires 15 is held by the films 19 and 16 to form the wire harness 20. Then, as described later, the connectors 18 are fixed together with the wire harness 20, and a flat circuit body 23 is formed (see FIGS. 5A and 5B).

In the embodiment, a width of the upper die film 19 is set so that the upper film 9 can cover outer peripheral portions of the connectors 18 arranged on the branch wirings 15b, as shown in FIG. 3B. Specifically, the width is set so that the upper film 19 can cover the outer peripheral portions of the connectors 18 except for the end portions 18a of the connectors 18. Therefore, the end portions 18a of the connectors 18 are not covered with the upper die film 19. Such an upper die film 19 is bonded to the connectors 18 by the above-described vacuum suction and heating of the vacuum forming die 11.

As described above, the other portion of the upper die film 19 is bonded to the lower die film 16. By bonding the upper die film 19 to the connectors 18 in this manner, the upper and lower films 19 and 16 are bonded to each other with the connectors 18 interposed therebetween.

Figure 5A:
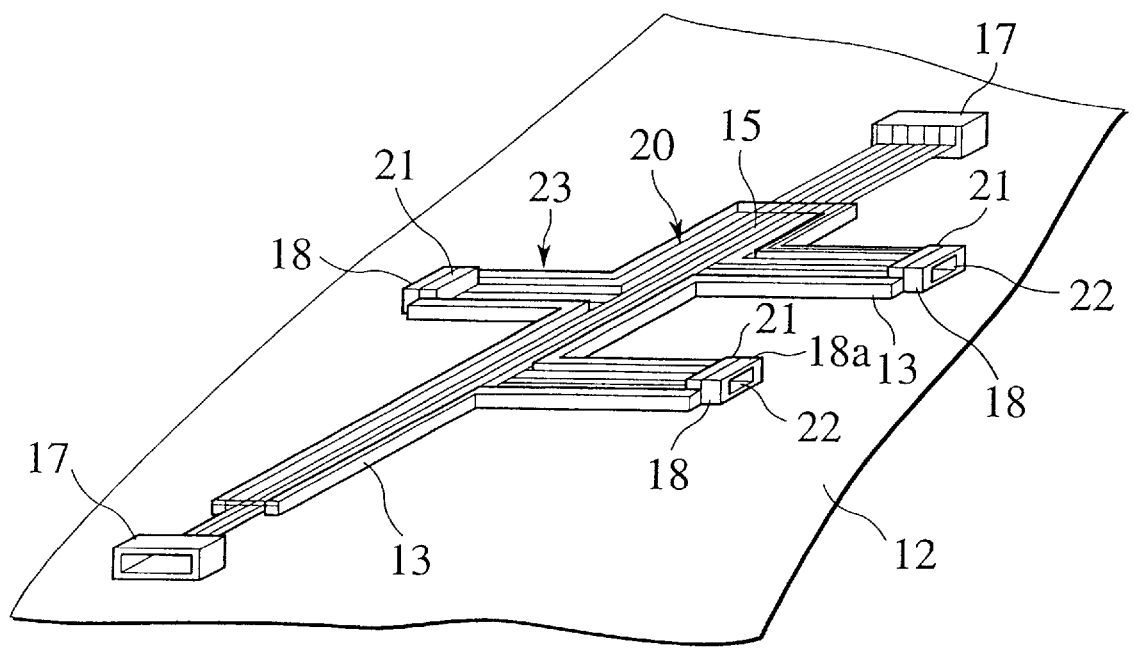
FIGS. 5A and 5B show a produced circuit body.
Figure 5B:
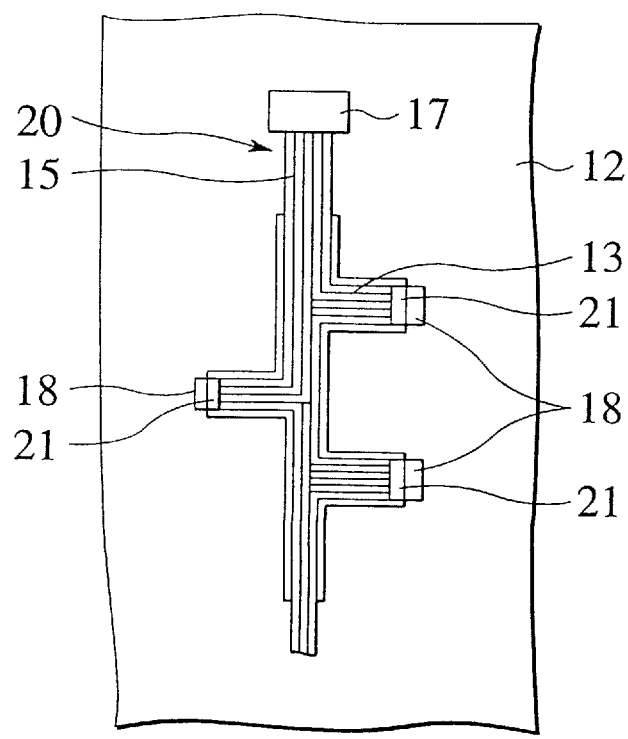

A reference numeral 21 in FIGS. 5A and 5B designates connector fixing portions of the film 19. The connector fixing portions 21 fix the connectors 18 in proper positions to prevent the connectors 18 from tottering. Therefore, the connectors 18 can be easily fitted to the mating connectors without positioning.

The connector fixing portions 21 are integrally provided to the outer peripheral portion of the upper die film 19, so that the connector fixing portions 21 integral with the other portion of the upper die film 19 cover and reliably waterproof the terminal portions of the electric wires 15. Therefore, a waterproof treatment for the terminal portions is unnecessary, and the wire harness 20 can be produced easily and speedily.

Further, since the connector fixing portions 21 are not provided to the end portions 18a of the connectors 18, the connector fixing portions 21 do not close connection openings 22 on the side of the end portions 18a. Therefore, the connector fixing portions 21 do not become hindrances to fitting of the mating connectors into the connection openings 22.

After the arrange shape of the wire 15 is held and the connectors 18 are fixed by the above steps, the suction is stopped by the vacuum forming die 11, the wire harness 20 is released from the vacuum forming die 11, and the producing process is completed.

As described above, according to the present embodiment, the connectors 18 do not totter because the connectors 18 are fixed to the proper positions by the connector fixing portions 21 provided to the upper and lower die films 19 and 16, and can be easily fitted to the mating connectors. Also, the connectors 18 are integral with the upper and lower films 19 and 16, and the connectors 18 can be reliably waterproofed. Consequently, the waterproof treatment for the terminal portions is unnecessary, and the wire harness 20 can be produced easily.

By forming the connector fixing portions 21 on one of the films 19 and 16, it is possible to treat the other film in a conventional manner, and the connector fixing portions 21 can be formed easily.

Furthermore, because the upper and lower films 19 and 16 are bonded to each other to provide the arrange shape to the electric wires 15, and simultaneously as which, the upper and lower films 19 and 16 are bonded to the outer peripheral portions of the connectors 18 to fix the connectors 18, a step for fixing the connectors 18 is unnecessary, and the connectors 18 can be fixed speedily and easily.

Since the connectors 18 are provisionally fixed in the arranging recess portion 14, the connectors 18 are not displaced when they are fixed by bonding the upper and lower films 19 and 16 to each other, and the connectors 18 can be fixed accurately.

Also, because the space between the projecting ribs is used as the arranging recess portion 14, the arranging recess portion 14 can be formed or changed easily.

What is claimed is:

1. A process for producing a circuit body comprising the steps of:

arranging in an arranging recess portion of a vacuum forming die a plurality of electric wires having a terminal portion attached to a connector, with the electric wires intervening between an upper film and a lower film, wherein said vacuum forming die has a lower face that is substantially flat and is provided with sucking holes and wherein said lower face is further provided with projecting ribs extending upwardly from the lower face, the ribs having a space therebetween used as the arranging recess portion;

interposing a portion of an outer peripheral portion of the connector between the upper film and the lower film while not interposing another portion of the outer peripheral portion of the connector between the upper film and the lower film, the noninterposed portion being generally distal to the attached electric wires as compared to the interposed portion;

vacuum sucking a gas through the sucking holes in the lower face of the vacuum forming die to bond the upper film and the lower film to each other and to hold an arrange shape of the electric wires; and fixing the connector between the upper and lower film.

2. A process for producing a circuit body according to claim 1 further comprising a step of disposing said connector in the arranging recess portion to provisionally fix the connector when arranging the electric wires in the vacuum forming die.

3. A process for producing a circuit body according to claim 2, wherein said vacuum forming die is provided with projecting ribs, the ribs having a space therebetween used as the arranging recess portion.

4. A method for producing a circuit body comprising:

providing a wire harness having a plurality of electric wires formed into an arranged shape, the electric wires having a terminal portion;

arranging a connector on the terminal portion of the electric wires, the connector having an outer peripheral portion including an end portion, at least a portion of the end portion facing generally away from the electric wires; and holding the electric wires in the arranged shape with an upper and a lower film bonded to each other and with the electric wires intervening therebetween, the upper and lower films having a connector fixing portion bonded to the outer peripheral portion of the connector except for the end portion thereof to fix the connector.

5. A method for producing a circuit body according to claim 4, wherein the connector fixing portion is formed on the upper film or on the lower film.

6. A method for producing a circuit body for use in an automobile comprising:

attaching a plurality of electric wires to a connector having a perimeter including an inner face and an outer face, the inner face of the connector being generally nearer to the attached electric wires than the outer face of the connector;

placing the plurality of electric wires into a vacuum forming die, wherein said vacuum forming die has a lower face that is substantially flat and is provided with sucking holes and wherein said lower face is further provided with projecting ribs extending upwardly from the lower face, the ribs having a space therebetween used as the arranging recess portion;

covering the plurality of electric wires with a film, wherein the film includes a lower film arranged below the plurality of electric wires when the wires are placed in the die and an upper film arranged above the plurality of electric wire when the wires are placed in the die;

vacuum sucking a gas through the sucking holes in the lower face of the vacuum forming die to bond the upper film and the lower film to each other and to hold an arranged shape of the electric wires; and removing the film covered plurality of electric wires from the die.

7. A method for producing a circuit body according to claim 6, wherein the connector has a generally rectangular configuration and the inner face of the connector has a length generally equal to a length of the outer face of the connector.

8. A method for producing a circuit body according to claim 6, wherein an adhesive is applied to the upper film and to the lower film.

9. A method for producing a circuit body according to claim 8, wherein the plurality of electric wires are covered by the film through bonding the film with the applied adhesive to the wires by applying heat to the die when the film, the adhesive and the wires are placed within the die.

10. A method for producing a circuit body according to claim 6, wherein the plurality of electric wires are completely covered with the film and the inner face of the connector is completely covered with the film but the outer face of the connector is not completely covered with the film so as to inhibit the connector from tottering and to allow the connector to be easily connected to a mating connector.

11. A method for producing a circuit body according to claim 6, wherein the film is formed of a composition that is generally waterproof.

* * * * *

UNITED STATES PATENT AND TRADEMARK OFFICE
CERTIFICATE OF CORRECTION

PATENT NO. : 6,272,746 B1
DATED : August 14, 2001
INVENTOR(S) : Toshiyuki Mori

It is certified that error appears in the above-identified patent and that said Letters Patent is hereby corrected as shown below:

<u>Title page,</u>
Item [57], ABSTRACT,
Line 1, after "harness" delete the comma.
Line 1, "an arrange shape" should read -- an arranged shape --.

<u>Column 5,</u>
Line 46, "arrange shape" should read -- arranged shape --.

Signed and Sealed this

Twenty-third Day of July, 2002

Attest:

Attesting Officer

JAMES E. ROGAN
*Director of the United States Patent and Trademark Office*